United States Patent
Huang

(10) Patent No.: US 7,086,790 B2
(45) Date of Patent: Aug. 8, 2006

(54) AUTOMATIC FOCUSING LENS ASSEMBLY IN A CAMERA

(75) Inventor: Ming-Huang Huang, Taipei (TW)

(73) Assignee: Camdeor Technology Co., Ltd., Taipei Hsien (TW)

( * ) Notice: Subject to any disclaimer, the term of this patent is extended or adjusted under 35 U.S.C. 154(b) by 100 days.

(21) Appl. No.: 10/910,297

(22) Filed: Aug. 4, 2004

(65) Prior Publication Data

US 2005/0169626 A1    Aug. 4, 2005

(30) Foreign Application Priority Data

Jan. 30, 2004    (TW) .............................. 93102186 A

(51) Int. Cl.
G03B 17/00    (2006.01)
G02B 9/34    (2006.01)

(52) U.S. Cl. ..................... 396/439; 396/89; 359/771; 359/779

(58) Field of Classification Search ............... 359/734, 359/747, 771–783; 396/89, 439
See application file for complete search history.

(56) References Cited

U.S. PATENT DOCUMENTS

| | | | | |
|---|---|---|---|---|
| 2,432,387 | A * | 12/1947 | Creighton | ................... 359/779 |
| 4,787,724 | A * | 11/1988 | Kudo et al. | ................. 359/790 |
| 6,239,921 | B1 * | 5/2001 | Isono | .......................... 359/717 |
| 6,549,344 | B1 * | 4/2003 | Tsutsumi | .................... 359/752 |

* cited by examiner

Primary Examiner—W. B. Perkey
Assistant Examiner—Rishi Suthar
(74) Attorney, Agent, or Firm—Rosenberg, Klein & Lee

(57) ABSTRACT

A lens assembly in a camera includes a first meniscus lens (10) and a second meniscus lens (11) respectively having a first radius of curvature (A,A') and a second radius of curvature (B,B') larger than that of the first radius of curvature A,A'), a concave lens (12) having a first radius of curvature (C) and a second radius of curvature (C') smaller than the first radius of curvature (C), and a convex lens (13) having two opposite sides with a radius of curvature so that after a distance between the lens to the object is determined, a clear image is presented.

3 Claims, 1 Drawing Sheet

AUTOMATIC FOCUSING LENS ASSEMBLY IN A CAMERA

BACKGROUND OF THE INVENTION

1. Field of the Invention

The present invention relates to a camera, and more particularly to an automatic focusing lens assembly in a camera to enable the user to clearly see things both far and near.

2. Description of Related Art

Current cameras that focus on a particular site are normally equipped with an image receiving assembly to receive an image, an image processing assembly to process the image signal and a lens assembly to automatically adjust the focal length to allow the user to see things clearly. Therefore, the user is able to use the camera to clearly see things both far and near. In order to have the ability to adjust the focal length of the lens assembly, a mechanical driving mechanism is installed inside the camera to accomplish the purpose of focal length change so that the image is able to be presented clearly.

However, to drive the mechanical driving mechanism, a complex circuit board occupying a large space inside the camera is required, which is the primary reason that the current camera is too bulky. Furthermore, the installation of this mechanical driving mechanism and the circuit board increases the manufacture cost, with the consequence that the price is high.

To overcome the shortcomings, the present invention tends to provide an improved lens assembly to mitigate the aforementioned problems.

SUMMARY OF THE INVENTION

The primary objective of the present invention is to provide an improved lens assembly to omit the requirement of a mechanical driving mechanism but still accomplish the goal of changing the focal length of the lens assembly to enable the user to clearly see things both far and near through the camera.

Other objects, advantages and novel features of the invention will become more apparent from the following detailed description when taken in conjunction with the accompanying drawings.

DESCRIPTION OF THE PREFERRED EMBODIMENTS

Figure 1:
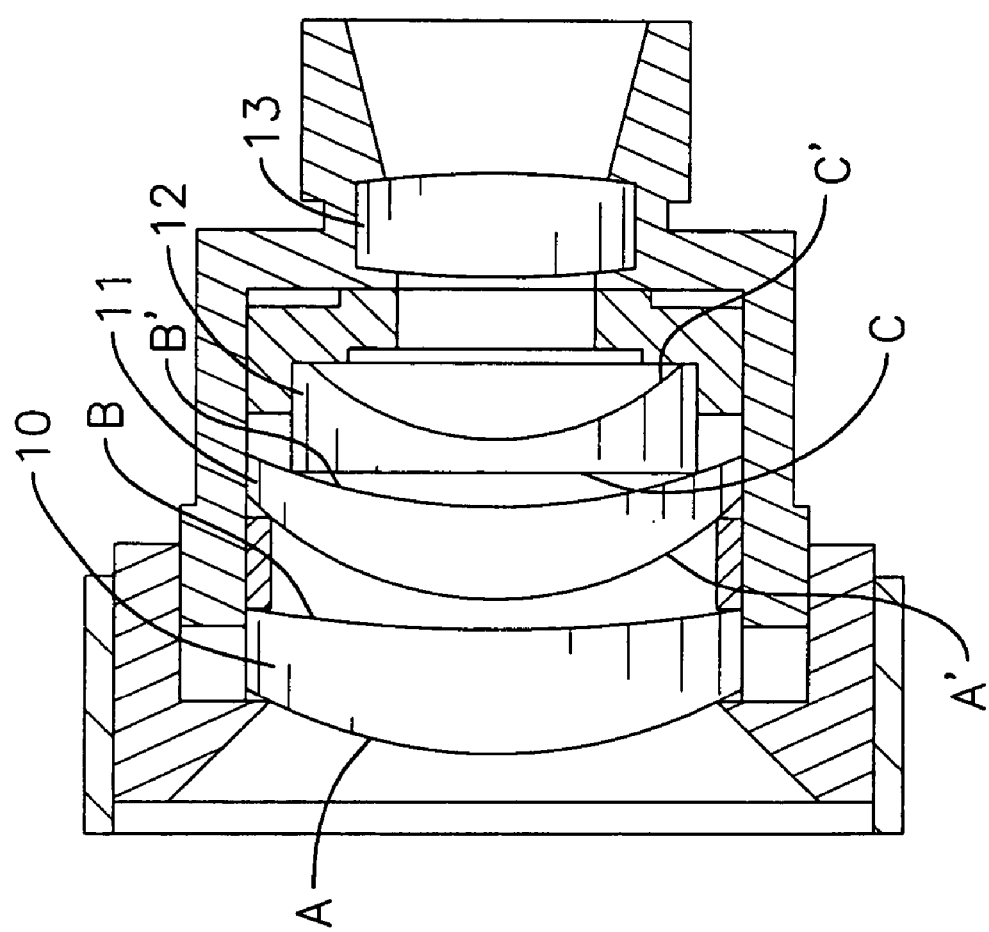
FIG. 1 is a structural schematic view showing the arrangement of the lenses of the lens assembly of the present invention.

With reference to FIG. 1, the primary improvement of the present invention is to provide a lens assembly to clearly present an image in the camera no matter whether the object is far from or close to the lens assembly. The principle of the lens assembly is the same as that of the nerve system in the retina of a human eye, which is able to clearly and automatically show an image an the eyeball.

An image receiving assembly, an image processing assembly to process the image signal and an illuminating assembly inside a camera are all conventional in the art such that detailed description thereof is omitted. The following discussion is focused on the structure of the lens assembly.

The lens assembly in accordance with the present invention includes a first meniscus lens (10), a second meniscus lens (11), a concave lens (12) and a convex lens (13), wherein the first meniscus lens (10) and the second meniscus lens (11) respectively have a first radius of curvature (A,A') and a second radius of curvature (B,B') larger than that of the first radius of curvature (A,A'). The concave lens (12) has a first radius of curvature (C) and a second radius of curvature (C') smaller than the first radius of curvature. Each of opposite sides of the convex lens (13) has a radius of curvature the same as each other. It is noted that the first side having the first radius of curvature of the first meniscus lens (10), the second meniscus lens (11) and the concave lens (12)is the side face to receive an object image and the second side having the second radius of curvature of the first meniscus lens (10), the second meniscus lens (11) and the concave lens (12) is the side face to present an image of the object.

Furthermore, the first meniscus lens (10) is to shorten the distance between the object and the first meniscus lens (10) and to present the object image onto the second meniscus lens (11) and the concave lens (12). Thereafter, the convex lens (13) is to present the object image to the image receiving assembly and the image processing assembly.

The arrangement of the lens assembly of the present invention is based on the following formula:

$$1/v + 1/u = 1/f$$

where
    $f \leq$ focus length;
    u=distance between the object and the lens; and
    v=image distance Therefore, the arrangement of the lenses is using the theory of u=v and object length=image length.

For instance, when an object is located more than two times the focal length away from the lens, the image presented is shrunk; when the object is located exactly on two times the focal length away from the lens, the image presented is exactly the same as that of the object; and when the object is located more than one focal length away from the lens, the image presented is infinitely far away. When the object is located within one focal length, only a virtual image is presented. Further, when the object is infinitely far away, the image is presented on the focus.

The following is one example of the application of the lens assembly of the present invention, wherein the first meniscus lens (10) has a central thickness 5.1±−0.1 mm. The first radius of curvature (A) of the first meniscus lens (10) is 14.155 mm and the second radius of curvature (B) of the first meniscus lens (10) is 201.8 mm.

The second meniscus lens (11) has a central thickness 3.1±−0.1 mm, The first radius of curvature (A') thereof is 10.544 mm and the second radius of curvature (B') thereof is 17.298 mm.

The concave lens (12) has a central thickness 0.7±−0.1 mm. The first radius of curvature (C) thereof is 731.1 and the second radius of curvature thereof is 7.691 mm.

The convex lens (13) has a central thickness 3.5±−0.1 mm. The radius of curvature of both sides thereof is 21.33 mm.

The distance between the center of the first meniscus lens (10) and the second meniscus lens (11) is 0.1±−0.1 mm. The distance between the center of the second meniscus lens (11) and the concave lens (12) is 1.27 mm. The distance between the center of the concave lens (12) and the convex lens (13)

is 5.4.±−0.1 mm. The distance between the center of the convex lens (13) and the image receiving assembly is 12.64 mm.

After the aforementioned arrangement, that is, the distance to the object is determined, there is no requirement to adjust the relative distance among lenses and a clear image is presented. Thus the conventional complicated and complex mechanical driving mechanism is no longer required yet the camera equipped with the lens assembly of the present invention can still present a clear image. Accordingly, the camera is low in cost and the compact.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. In a camera having an image receiving assembly, an illuminating assembly, an image processing assembly and a lens assembly, wherein the improvements comprise:

the lens assembly having:
- a first meniscus lens (10) and a second meniscus lens (11) immediately adjacent to the first meniscus lens (10) and respectively having a first radius of curvature (A,A') and a second radius of curvature (B,B') larger than that of the first radius of curvature (A,A');
- a concave lens (12) immediately adjacent to the second meniscus lens (11) and having a first radius of curvature (C) and a second radius of curvature (C') smaller than the first radius of curvature (C); and
- a convex lens (13) immediately adjacent to the concave lent (12) and having two opposite sides with a common radius of curvature.

2. The camera as claimed in claim 1, wherein arrangement of the lenses (11,12,13) is based on the following formula:

$$1/v+1/u=1/f$$

where
f=focus length;
u=distance between the object and the lens; and
v=image distance.

3. The camera as claimed in claim 2, wherein the first meniscus lens (10) has a central thickness 5.1±−0.1 mm, the first radius of curvature (A) of the first meniscus lens (10) is 14.155 mm and the second radius of curvature (B) of the first meniscus lens (10) is 201.8 mm;

the second meniscus lens (11) has a central thickness 3.1±−0.1 mm, the first radius of curvature (A') thereof is 10.544 mm and the second radius of curvature (B') thereof is 17.298 mm;

the concave lens (12) has a central thickness 0.7±−0.1 mm, the first radius of curvature (C) thereof is 731.1 mm and the second radius of curvature (C') thereof is 7.691 mm;

the convex lens (13) has a central thickness 3.5±−0.1 mm, the radius of curvature of both sides thereof is 21.33 mm; a distance between a center of both the first meniscus lens (10) and the second meniscus lens (11) is 0.1±−0.1 mm, a distance between a center of both the second meniscus lens (11) and the concave lens (12) is 1.27 mm, a distance between a center of the concave lens (12) and the convex lens (13) is 5.4±−0.1 mm, a distance between the center of the convex lens (13) and the image receiving assembly is 12.64 mm.

* * * * *